(12) United States Patent
Ducci et al.

(10) Patent No.: US 9,211,765 B2
(45) Date of Patent: Dec. 15, 2015

(54) WINTER TYRE WITH IMPROVED TRACTION ON SNOW SURFACES

(75) Inventors: Stefano Ducci, Rome (IT); Antonio Tirone, Rome (IT); Alessandro Martini, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 921 days.

(21) Appl. No.: 13/497,329

(22) PCT Filed: Sep. 21, 2010

(86) PCT No.: PCT/IB2010/002378
§ 371 (c)(1),
(2), (4) Date: Jul. 17, 2012

(87) PCT Pub. No.: WO2011/036540
PCT Pub. Date: Mar. 31, 2011

(65) Prior Publication Data
US 2012/0273105 A1    Nov. 1, 2012

(30) Foreign Application Priority Data

Sep. 22, 2009 (IT) .............................. TO2009A0719

(51) Int. Cl.
*B60C 11/11* (2006.01)
*B60C 11/117* (2006.01)
(Continued)

(52) U.S. Cl.
CPC ......... *B60C 11/0311* (2013.04); *B60C 11/0309* (2013.04); *B60C 11/1281* (2013.04); *B60C 11/13* (2013.01); *B60C 11/032* (2013.04); *B60C 11/11* (2013.01); *B60C 2011/133* (2013.04)

(58) Field of Classification Search
CPC ........ B60C 11/11; B60C 11/13; B60C 11/03; B60C 11/0306; B60C 11/0309; B60C 11/032; B60C 11/0323; B60C 2011/133; B60C 2011/1338; B60C 2011/1392; B60C 2011/0341; B60C 2011/0353; B60C 2011/0355
USPC .................. 152/209.18, 209.17, 209.21, 902, 152/DIG. 1
See application file for complete search history.

(56) References Cited

U.S. PATENT DOCUMENTS 4,994,126 A * 2/1991 Lagnier .............. B29D 30/0606
                                                        152/209.18
5,031,680 A    7/1991 Kajikawa et al.
(Continued)

FOREIGN PATENT DOCUMENTS

EP    2130692    * 12/2009
JP    2-53608 A    2/1990
(Continued)

OTHER PUBLICATIONS

International Search Report for PCT/IB2010/002378 dated Dec. 10, 2010.
(Continued)

*Primary Examiner* — Eric Hug
(74) *Attorney, Agent, or Firm* — Sughrue Mion, PLLC

(57) ABSTRACT

A winter tire with improved traction on snow surfaces; the tire has a tread with a raised pattern defined by a number of longitudinal and transverse grooves which form at least one longitudinal row of blocks projecting radially from a base surface of the tread. Each block has two longitudinal lateral surfaces bounding two corresponding longitudinal grooves, and two transverse lateral surfaces bounding two corresponding transverse grooves. At least one of the blocks has lateral channels, each of which is formed on the lateral surface of a corresponding block, extends from the base surface of the tread to a top surface of the block, and is designed to impede radial spin-out of snow trapped inside the lateral channel.

19 Claims, 9 Drawing Sheets

(51) Int. Cl.
*B60C 11/13* (2006.01)
*B60C 11/03* (2006.01)
*B60C 11/12* (2006.01)

(56) References Cited

U.S. PATENT DOCUMENTS

| | | | |
|---|---|---|---|
| 5,240,053 A | 8/1993 | Baumhöfer et al. | |
| 6,378,583 B1* | 4/2002 | Fontaine | 152/209.18 |
| 6,986,372 B2* | 1/2006 | Below | 152/209.15 |
| 7,537,033 B2* | 5/2009 | Yamane | 152/209.21 |
| 7,950,426 B2* | 5/2011 | Byrne | 152/209.17 |
| 8,191,591 B2* | 6/2012 | Shimizu | 152/209.18 |
| 8,267,133 B2* | 9/2012 | Kojima | 152/209.3 |
| 8,302,645 B2* | 11/2012 | Takahashi | 152/209.17 |
| 8,413,696 B2* | 4/2013 | Doan et al. | 152/209.18 |
| 8,439,093 B2* | 5/2013 | Takahashi | 152/209.17 |
| 2006/0042738 A1* | 3/2006 | Matsumoto | 152/209.21 |
| 2007/0240801 A1* | 10/2007 | Tanaka | 152/209.21 |
| 2008/0047641 A1* | 2/2008 | Takahashi | 152/209.3 |

FOREIGN PATENT DOCUMENTS

| | | |
|---|---|---|
| JP | 2005-1593 * | 1/2005 |
| JP | 2008-296730 A | 12/2008 |
| WO | 03/013881 A1 | 2/2003 |

OTHER PUBLICATIONS

Notification of Reasons for Refusal, dated Jun. 24, 2014, issued by the Japanese Patent Office, in counterpart Application No. 2012-530352.

* cited by examiner

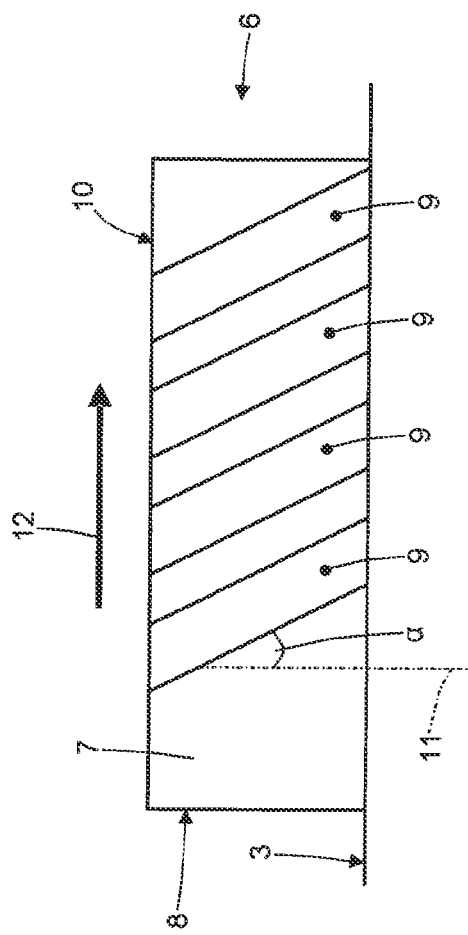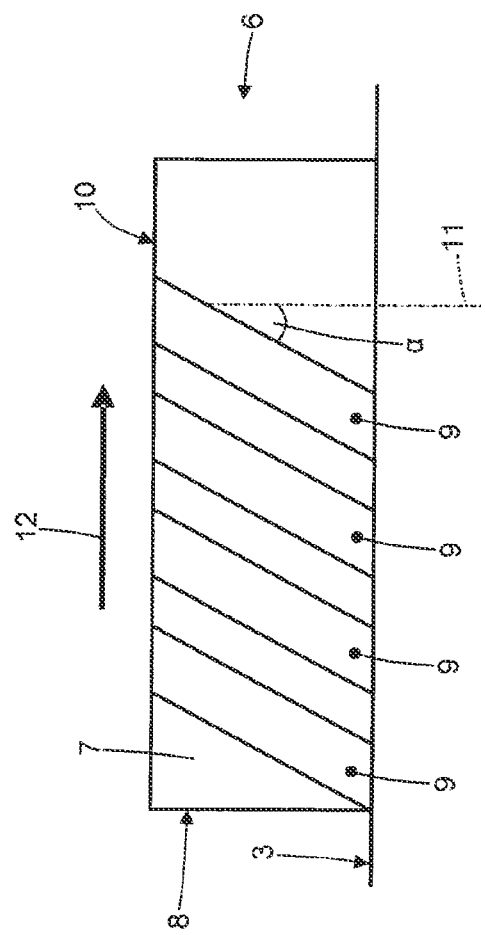

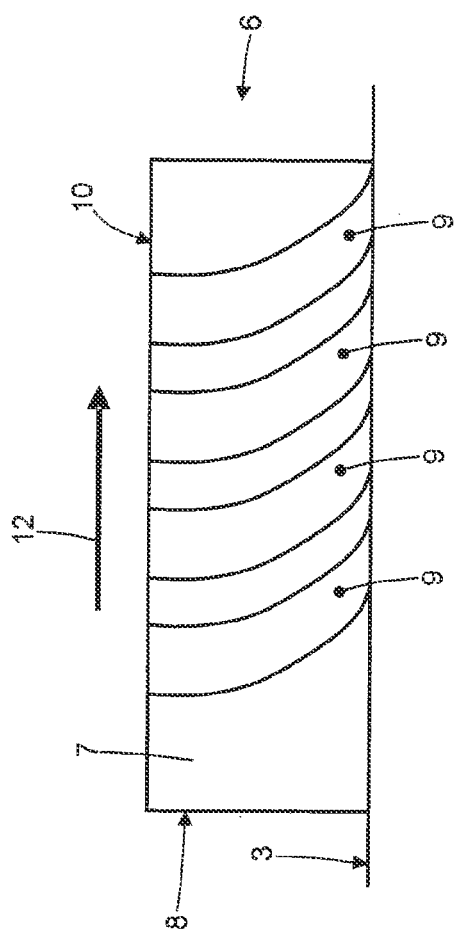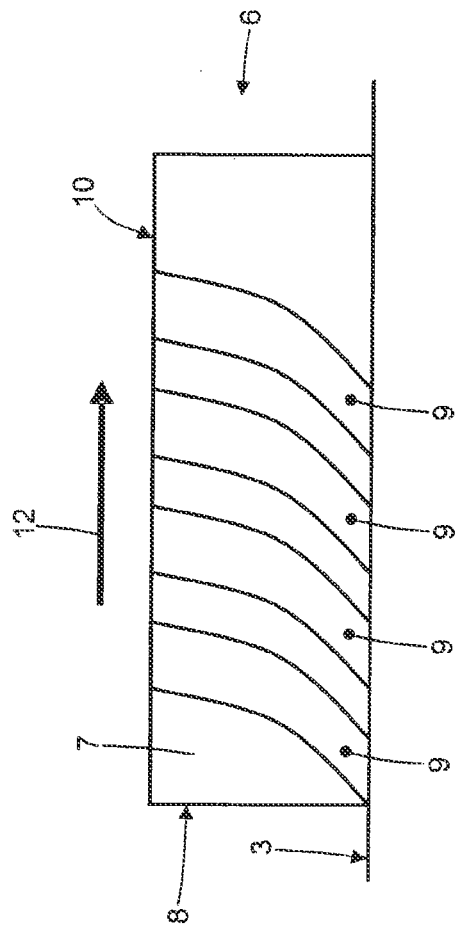

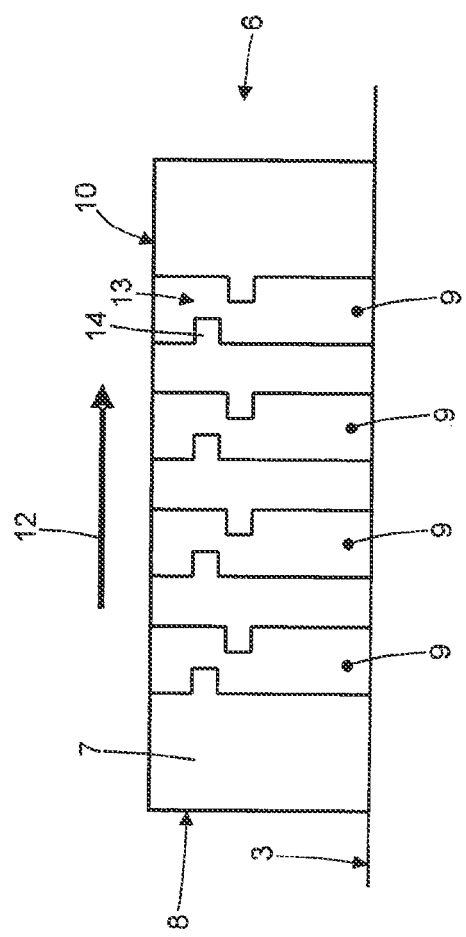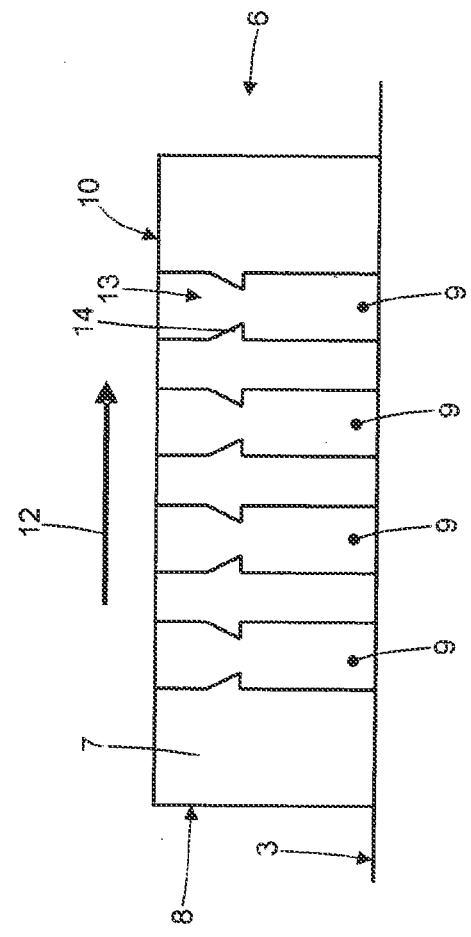

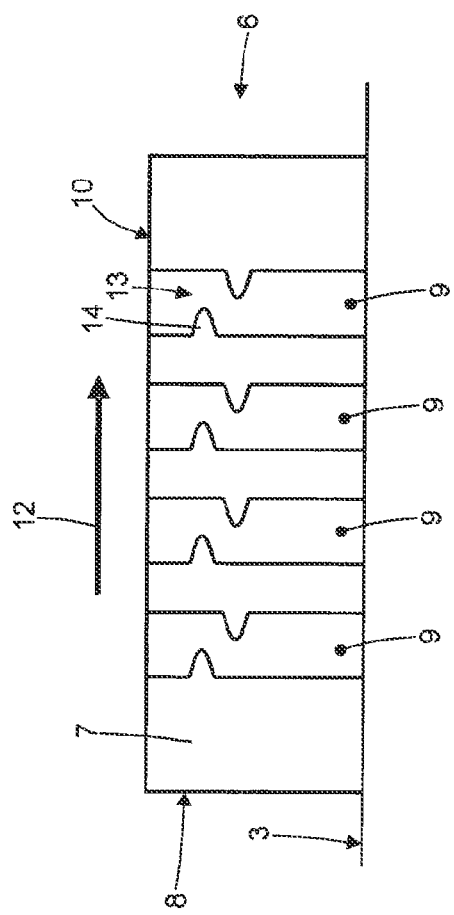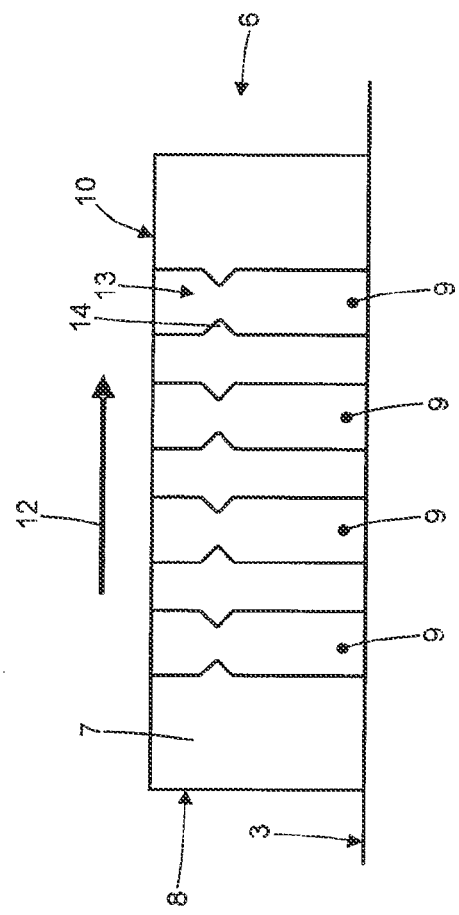

ABSTRACT

WINTER TYRE WITH IMPROVED TRACTION ON SNOW SURFACES

CROSS REFERENCE TO RELATED APPLICATIONS

This application is a National Stage of International Application No. PCT/IB2010/002378 filed Sep. 21, 2010, claiming priority based on Italian Patent Application No. TO2009A000719 filed Sep. 22, 2009, the contents of all of which are incorporated herein by reference in their entirety.

TECHNICAL FIELD

The present invention relates to a winter tyre with improved traction on snow surfaces.

BACKGROUND ART

One of the most important characteristics of a winter tyre is its grip on snow surfaces (i.e. surfaces completely covered with snow), and therefore its ability to generate adequate friction as it rolls along the snow surface.

The friction generated between a winter tyre and a snow surface is the sum of a digging force, produced by the tyre tread penetrating the snow cover, and a shearing force, produced by friction between the snow trapped in the tyre tread (in particular, in the tread grooves) and the snow cover.

To increase the shearing force, the amount of snow trapped inside the tyre tread grooves must be increased; and, to increase the digging force, the tread pattern must have lots of edges capable of creating pressure peaks on the snow surface to penetrate the snow cover.

To increase the amount of snow trapped inside the tread grooves of a winter tyre, it has been proposed to form zig-zag lateral surfaces on the blocks defining the grooves. By so doing, the snow inside the groove tends to adhere to the zig-zag lateral surfaces of the blocks, thus trapping more snow inside the groove.

Patent Application W003013881A1 proposes a winter tyre particularly suitable for snow surfaces, and in which the lateral surfaces of each tread block have triangular or arrow-shaped cavities, which vary in depth (are shallowest at the tip) and are significantly elongated towards the facing groove.

Though successful in trapping more snow inside the tread grooves of winter tyres, and so increasing the shearing force, the above solutions fail to also increase the digging force and so achieve a winter tyre of good overall performance on snow surfaces.

DESCRIPTION OF THE INVENTION

It is an object of the present invention to provide a winter tyre with improved traction on snow surfaces, and which is designed to eliminate the above drawbacks, provides for excellent grip on snow surfaces, and, in particular, is cheap and easy to produce.

According to the present invention, there is provided a winter tyre with improved traction on snow surfaces, as claimed in the accompanying Claims.

BRIEF DESCRIPTION OF THE DRAWINGS

A non-limiting embodiment of the present invention will be described by way of example with reference to the accompanying drawings, in which:

FIG. 2 shows a larger-scale side view of a tread block of the FIG. 1 tyre;

FIGS. 3-7 show larger-scale side views of three variations of the FIG. 2 tread block;

FIGS. 10-16 show larger-scale side views of three variations of the FIG. 8 tread block.

PREFERRED EMBODIMENTS OF THE INVENTION

Figure 1:
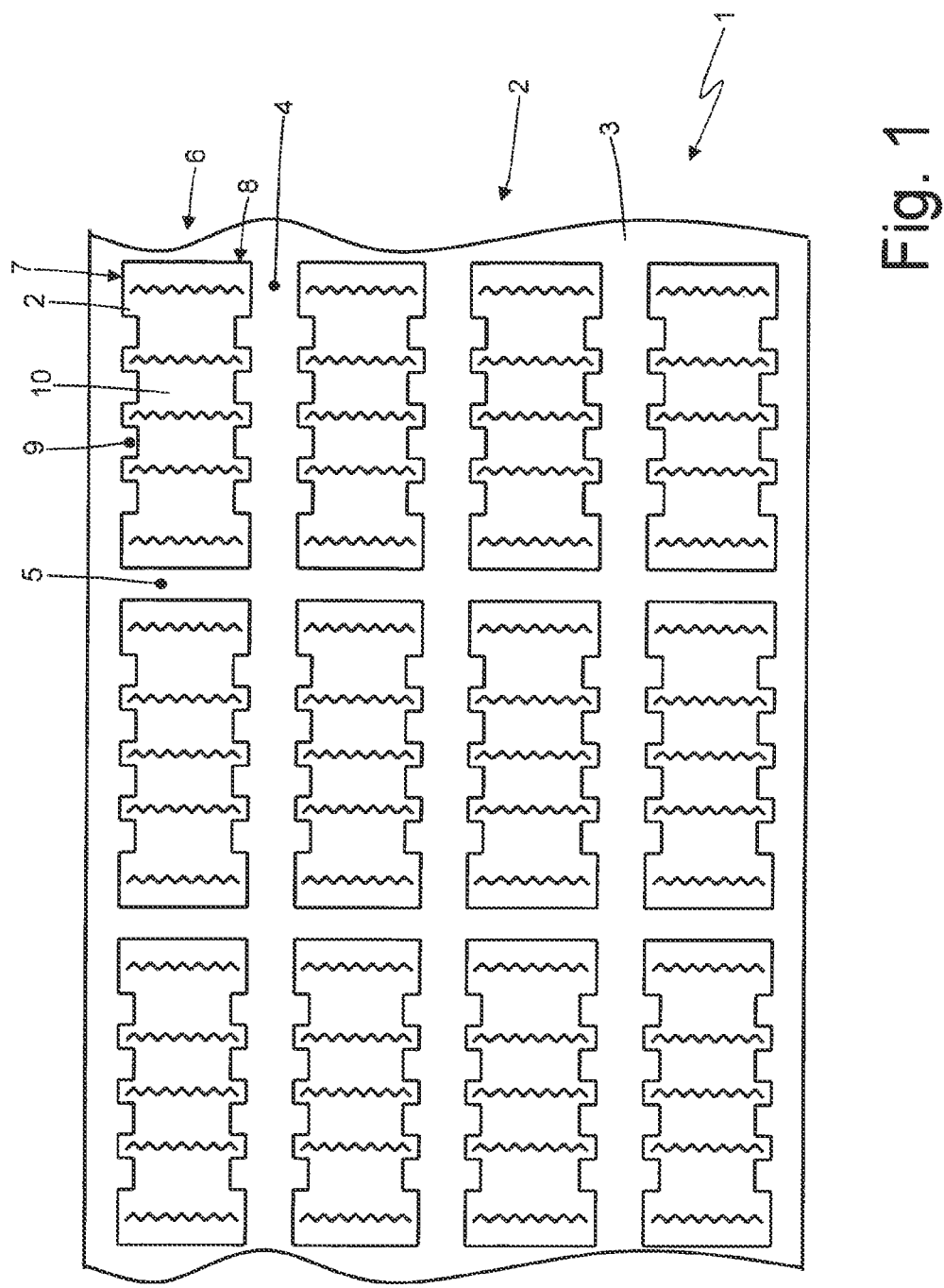
FIG. 1 shows a schematic plan view, with parts removed for clarity, of a portion of a winter tyre in accordance with the present invention.

Number 1 in FIG. 1 indicates as a whole a winter tyre comprising a tread 2 with a toroidal base surface 3 extending about a central axis of rotation.

Tread 2 has a raised pattern defined by a number of longitudinal or circumferential grooves 4 (i.e. extending crosswise to the axis of rotation, along the circumference of the tread) and a number of transverse grooves 5 (i.e. parallel to the axis of rotation and perpendicular to longitudinal grooves 4. Longitudinal grooves 4 and transverse grooves 5 form four longitudinal rows of blocks 6 projecting radially from base surface 3 of tread 2. Each block 6 is roughly parallelepiped-shaped with a rectangular cross section, and has two longitudinal lateral surfaces 7 bounding two corresponding longitudinal grooves 4; and two transverse lateral surfaces 8 bounding two corresponding transverse grooves 5.

Each block 6 has lateral channels 9, each formed on a longitudinal lateral surface 7 of block 6, and extending from base surface 3 of tread 2 to a top surface 10 of block 6. In the FIG. 1 embodiment, each block 6 has eight lateral channels 9 equally spaced on both opposite longitudinal lateral surfaces 7. Alternatively lateral channels 9 may be formed on only one longitudinal lateral surface 7, also on transverse lateral surfaces 8, or only on transverse lateral surfaces 8.

In a preferred embodiment, each block 6 has zig-zag sipes formed radially through top surface 10 of block 6.

Each lateral channel 9 is designed to impede radial spin-out of the snow trapped inside it, and more specifically to retain and prevent an inner portion of the snow trapped inside it from being spun out radially. In other words, snow is spun out of an outer portion of lateral channel 9 (i.e. close to top surface 10 of block 6), whereas an inner portion of lateral channel 9 (i.e. close to base surface 3 of tread 2) remains full of snow. As a result, the outer portion of lateral channel 9, which is empty on contacting the snow surface, tends to penetrate and dig into the snow cover (thus increasing the digging force of tyre 1), whereas the inner portion of lateral channel 9, which is filled with snow on contacting the snow surface, produces snow-snow contact, which increases the shearing force of tyre 1.

In other words, as tyre 1 rolls along, each block 6 comes cyclically into contact with the snow surface. When the block contacts the snow surface, the empty outer portion of each lateral channel 9 digs into the snow cover and also fills up with snow, whereas the snow-filled inner portion of lateral channel 9 produces snow-snow contact. And, as the block moves round, out of contact with the snow surface, snow is spun out of the outer portion of each lateral channel 9, while the inner portion of lateral channel 9 remains full of snow.

In a preferred embodiment, each lateral channel 9 has along its extension a discontinuity designed to impede radial spin-out of the snow trapped inside lateral channel 9, and which, in some embodiments, forms a clear boundary between the inner portion and outer portion of lateral channel 9.

Because of the above effect, tyre 1, on snow surfaces, has a high degree of both digging and shearing force, and so generates a high degree of overall friction far superior to that of known, currently marketed winter tyres.

As shown in FIGS. 2 and 3, each lateral channel 9 is straight and slopes with respect to a radial direction 11. The slope of each lateral channel 9 with respect to radial direction 11 reduces the centrifugal force component (also radial) pushing the snow out of lateral channel 9, and so impedes radial spin-out of the snow trapped inside lateral channel 9.

In a preferred embodiment, each lateral channel 9 slopes with respect to radial direction 11 by an angle α of roughly 20-60°, and in particular of 30-45° (as slope angle α increases, the amount of snow spun out of lateral channel 9 decreases). The above slope angle α values provide for partly emptying lateral channels 9 as required, i.e. for expelling snow from the outer portion of each lateral channel 9, and keeping the inner portion of each lateral channel 9 fully packed with snow, as the corresponding block 6 rotates successively into contact with the snow surface.

Each lateral channel 9 slopes in the same direction as the rotation direction 12 of tyre 1 in the FIG. 2 variation, and in the opposite direction to the rotation direction 12 of tyre 1 in the FIG. 3 variation. Lateral channels 9 sloping in the opposite direction to the rotation direction 12 of tyre 1 (FIG. 3) dig better into the snow cover, but allow more snow to be expelled, and so call for larger slope angles α and a more complex geometrical design of blocks 6. Conversely, lateral channels 9 sloping in the same direction as the rotation direction 12 of tyre 1 (FIG. 2) dig less into the snow cover, but retain snow better, and so call for smaller slope angles α and a less complex geometrical design of blocks 6.

Figure 4:
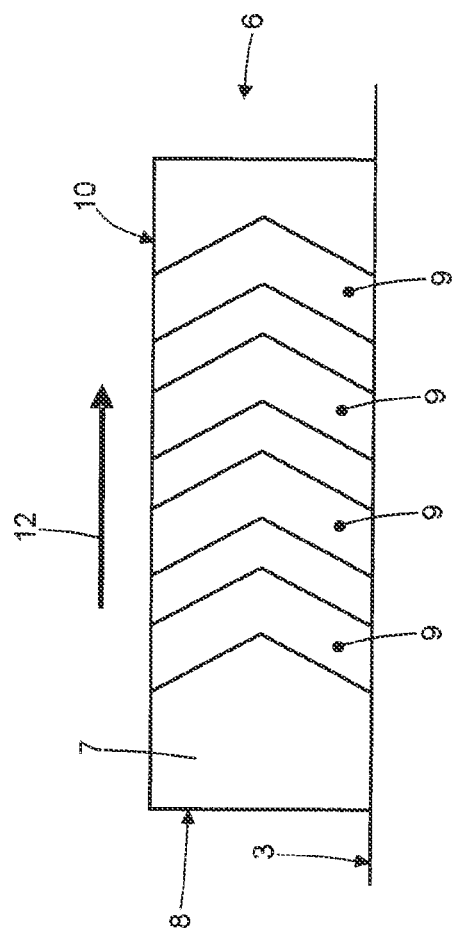
Figure 5:
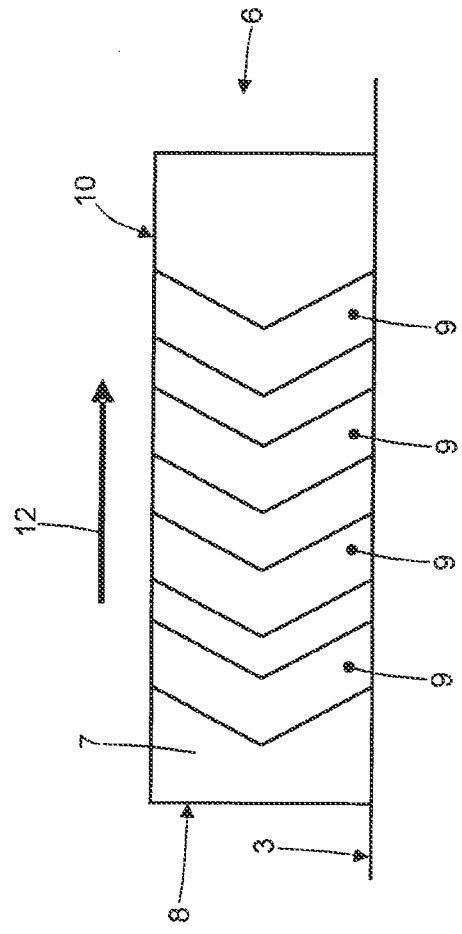
Figure 8:
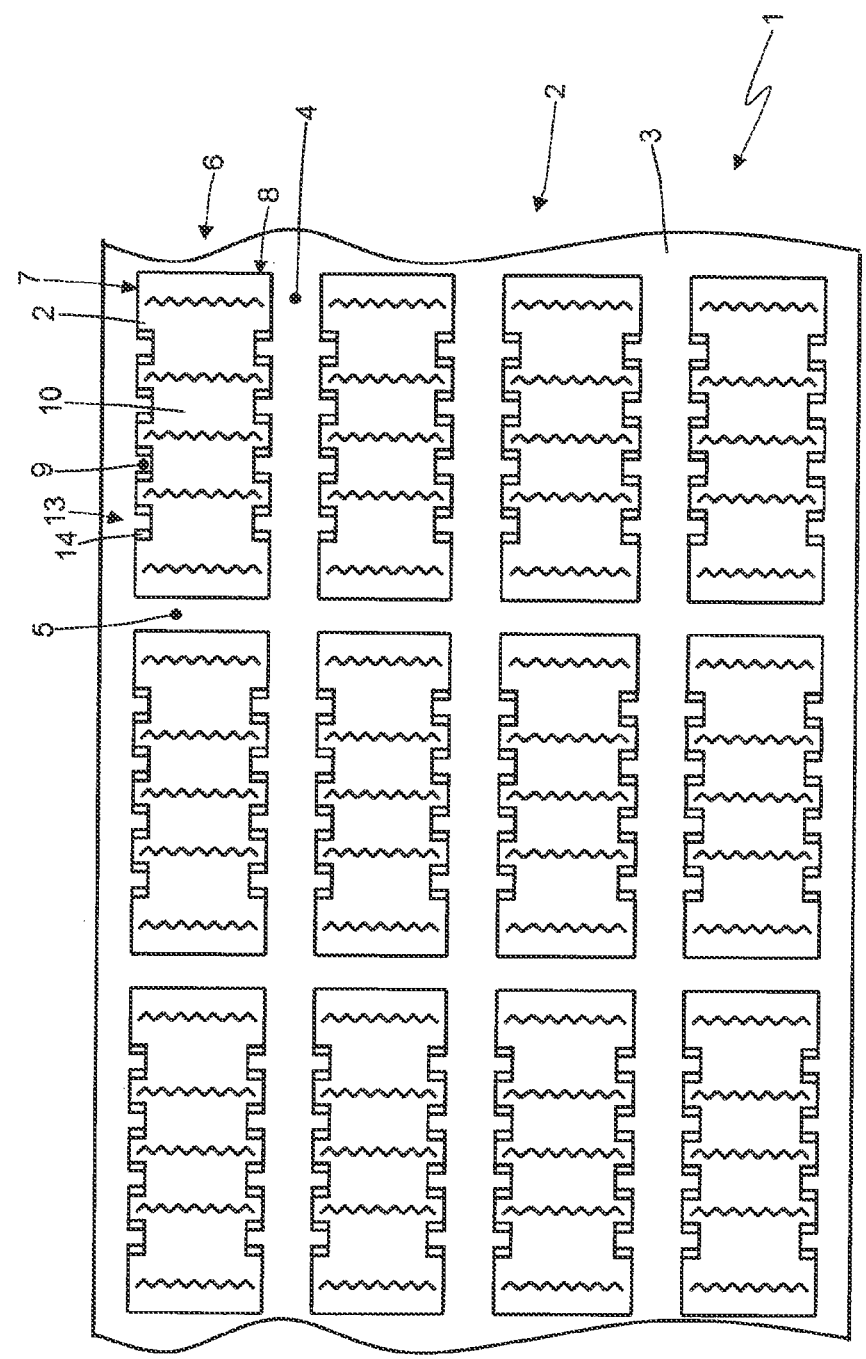
FIG. 8 shows a schematic plan view, with parts removed for clarity, of a portion of a further embodiment of a winter tyre in accordance with the present invention.

In the FIGS. 4 and 5 variation, each lateral channel 9 is zig-zag-shaped with two successive oppositely-inclined portions. As shown in FIGS. 4 and 5, each lateral channel 9 may be oriented differently with respect to the rotation direction 12 of tyre 1; and the change in the slope of lateral channel 9 represents said discontinuity along lateral channel 9.

In the FIGS. 6 and 7 variation, each lateral channel 9 is curved, and assumes a tangential direction at base surface 3 of tread 2, and a radial direction at top surface 10 of block 6. As shown in FIGS. 6 and 7, each lateral channel 9 may be oriented differently with respect to the rotation direction 12 of tyre 1; and the change in the slope of lateral channel 9 represents said discontinuity along lateral channel 9.

In the FIG. 8-16 embodiment, each lateral channel 9 has a constriction 13, which locally reduces the cross section of lateral channel 9, forms said discontinuity along lateral channel 9, and is typically defined by at least one projection 14 inside lateral channel 9.

Figure 9:
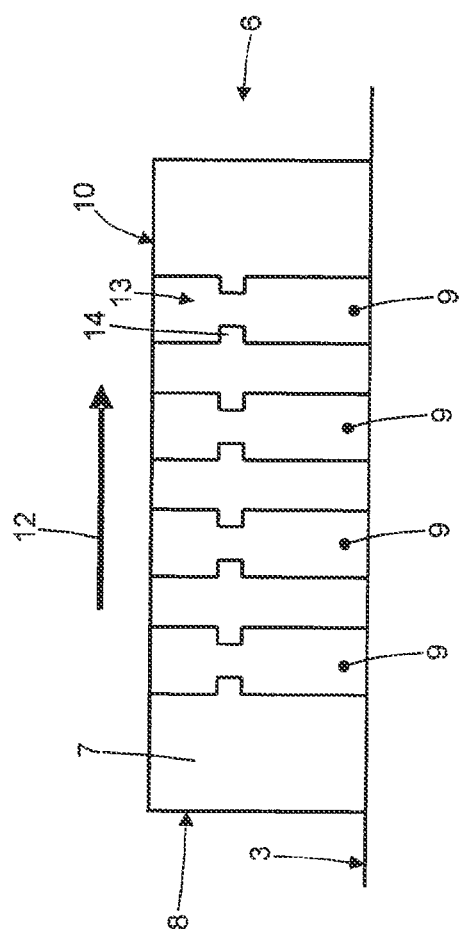
FIG. 9 shows a larger-scale side view of a tread block of the FIG. 8 tyre.

In the FIG. 9 variation, the constriction 13 of each lateral channel 9 is defined by two opposite, facing projections 14 (i.e. in the same radial position) inside lateral channel 9.

Figure 10:
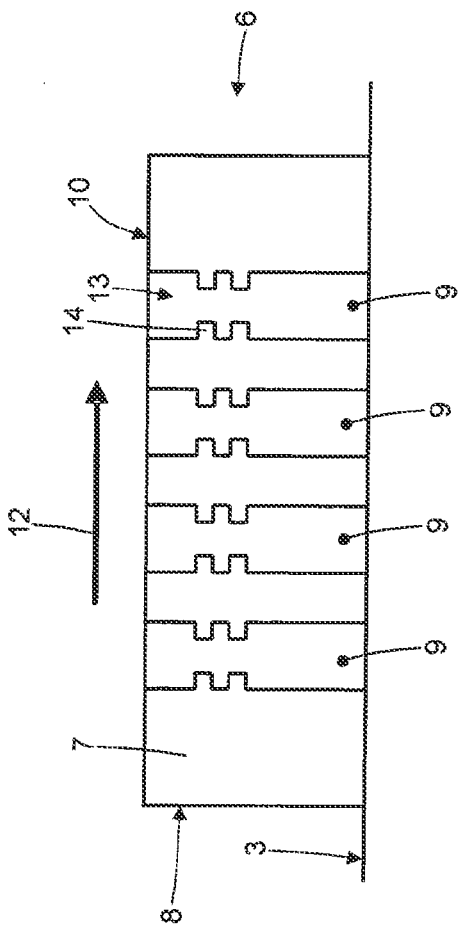
Figure 15:
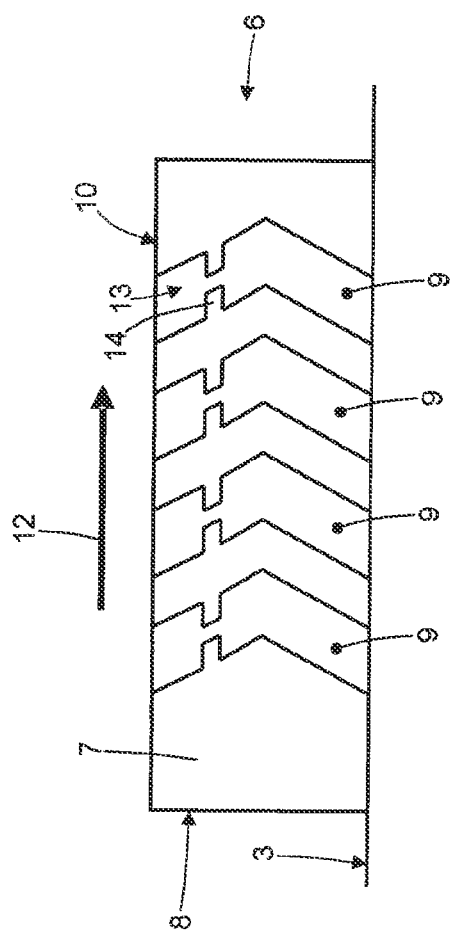
Figure 16:
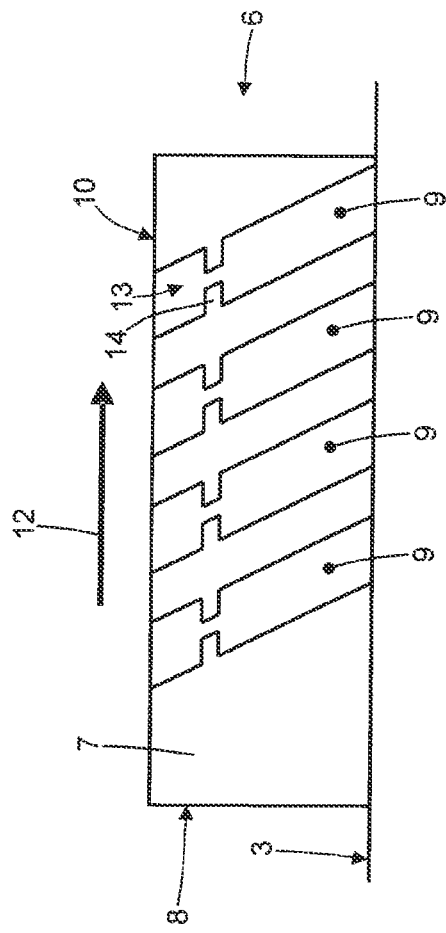

In the FIG. 10 variation, the constriction 13 of each lateral channel 9 is defined by two pairs of projections 14, one above the other.

In the FIG. 11 variation, the constriction 13 of each lateral channel 9 is defined by two projections 14 in different radial positions (i.e. offset radially) inside lateral channel 9.

In the FIG. 9-11 variations, each projection 14 is rectangular. In the FIG. 12-14 variations, each projection 14 is in the form of a right-angle triangle (or wedge), is rounded (either circular or elliptical), and is in the form of an isosceles or equilateral triangle (or pointed) respectively.

In the FIG. 9-14 variations, lateral channels 9 are straight and radial (i.e. do not slope at all with respect to radial direction 11). Alternatively, lateral channels 9 may be in any of the forms described previously and shown in FIGS. 2-7. For example, in the FIG. 15 variation, each lateral channel 9 is zig-zag-shaped, and has two successive, oppositely-inclined portions; and, in the FIG. 16 variation, each lateral channel 9 is straight, and slopes with respect to radial direction 11.

In the above embodiments, each lateral channel 9 has a rectangular cross section. Alternatively, each lateral channel 9 may have a differently shaped cross section, e.g. triangular, semicircular, or trapezoidal.

Winter tyre 1 as described has numerous advantages. Firstly, it is cheap and easy to produce—lateral channels 9 can be produced by simply designing the curing mold accordingly—and so involves no extra cost as compared with a conventional tyre. And secondly, by virtue of lateral channels 9 in blocks 6, tyre 1, on snow surfaces, has a high degree of both digging and shearing force, and so generates a high degree of overall friction far superior to that of known, currently marketed winter tyres.

The invention claimed is:

1. A winter tyre (1) with improved traction on snow surfaces;
   the tyre (1) comprises a tread (2) with a raised pattern defined by a number of longitudinal and transverse grooves (4) which form at least one longitudinal row of blocks (6) projecting radially from a base surface (3) of the tread (2);
   wherein each block (6) has two longitudinal lateral surfaces (7) bounding two corresponding longitudinal grooves (4); and two transverse lateral surfaces (8) bounding two corresponding transverse grooves (5); and
   wherein at least one of the blocks (6) has lateral channels (9), each formed on the lateral surface (7, 8) of a corresponding block (6) and extending from the base surface (3) of the tread (2) to a top surface (10) of the block (6);
   wherein at least one first lateral channel (9) slopes with respect to a radial direction (11); and
   wherein the first lateral channel is curved and assumes a tangential direction at the base surface of the tread, and a radial direction at the top surface of the block.

2. A winter tyre (1) as claimed in claim 1, wherein the first lateral channel (9) slopes in the same direction as the rotation direction (12) of the tyre (1).

3. A winter tyre (1) as claimed in claim 1, wherein the first lateral channel (9) slopes in the opposite direction to the rotation direction (12) of the tyre (1).

4. A winter tyre (1) as claimed in claim 1, wherein the first lateral channel (9) slopes at an angle (a) ranging between 20° and 60° with respect to the radial direction (11).

5. A winter tyre (1) as claimed in claim 1, wherein the first lateral channel (9) slopes at an angle (a) ranging between 30° and 45° with respect to the radial direction (11).

6. A winter tyre (1) as claimed in claim 1, wherein the first lateral channel (9) has along its extension at least one constriction (13), which locally reduces the section of the lateral channel (9) and defines a discontinuity to impede radial spin-out of the snow trapped inside the lateral channel (9).

7. A winter tyre (1) as claimed in claim 6, wherein the constriction (13) is defined by at least one projection (14) inside the lateral channel (9).

8. A winter tyre (1) as claimed in claim 6, wherein the constriction (13) is defined by at least two projections (14) in the same radial position inside the lateral channel (9).

9. A winter tyre (1) as claimed in claim 6, wherein the constriction (13) is defined by at least two projections (14) in two different radial positions inside the lateral channel (9).

10. A winter tyre (1) as claimed in claim 1, wherein the lateral channels (9) are formed solely in longitudinal lateral walls of the blocks (6).

11. A winter tyre (1) as claimed in claim 1, wherein the lateral channels (9) are formed both in longitudinal lateral walls of the blocks (6), and in transverse lateral walls of the blocks (6).

12. A winter tyre with improved traction on snow surfaces;
the tyre comprises a tread with a raised pattern defined by a number of longitudinal and transverse grooves which form at least one longitudinal row of blocks projecting radially from a base surface of the tread;
wherein each block has two longitudinal lateral surfaces bounding two corresponding longitudinal grooves; and two transverse lateral surfaces bounding two corresponding transverse grooves;
wherein at least one of the blocks has lateral channels, each formed on the lateral surface of a corresponding block and extending from the base surface of the tread to a top surface of the block;
wherein at least one first lateral channel slopes with respect to a radial direction; and
wherein at least one first lateral channel has along its extension at least one constriction, which locally reduces the section of the lateral channel and defines a discontinuity to impede radial spin-out of the snow trapped inside the lateral channel.

13. A winter tyre as claimed in claim 12, wherein the constriction is defined by at least one projection inside the lateral channel.

14. A winter tyre as claimed in claim 12, wherein the constriction is defined by at least two projections in the same radial position inside the lateral channel.

15. A winter tyre as claimed in claim 12, wherein the constriction is defined by at least two projections in two different radial positions inside the lateral channel.

16. A winter tyre as claimed in claim 12, wherein the first lateral channel is straight.

17. A winter tyre as claimed in claim 12, wherein the first lateral channel is curved.

18. A winter tyre (1) as claimed in claim 17, wherein the first lateral channel assumes a tangential direction at the base surface of the tread, and a radial direction at the top surface of the block.

19. A winter tyre as claimed in claim 12, wherein the first lateral channel is zig-zag-shaped, and has at least two successive oppositely-inclined portions.

* * * * *